US012700749B2

(12) United States Patent
Nagai

(10) Patent No.: US 12,700,749 B2
(45) Date of Patent: *Aug. 4, 2026

(54) UNIVERSAL SERIAL BUS PORT CONTROLLER AND ELECTRONIC APPARATUS FOR PREVENTING INRUSH CURRENT DURING POWER DELIVERY

(71) Applicant: ROHM Co., LTD., Kyoto (JP)

(72) Inventor: Kazuomi Nagai, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 898 days.

This patent is subject to a terminal disclaimer.

(21) Appl. No.: 17/931,932

(22) Filed: Sep. 14, 2022

(65) Prior Publication Data

US 2023/0079553 A1     Mar. 16, 2023

(30) Foreign Application Priority Data

Sep. 16, 2021     (JP) ................................. 2021-151541

(51) Int. Cl.
| | |
|---|---|
| *H02J 7/00* | (2026.01) |
| *H02J 7/34* | (2006.01) |
| *H02J 7/80* | (2026.01) |
| *H02J 7/90* | (2026.01) |

(52) U.S. Cl.
CPC .............. *H02J 7/933* (2026.01); *H02J 7/345* (2013.01); *H02J 7/80* (2026.01)

(58) Field of Classification Search
CPC ................................................. H02J 7/00712
USPC ....................................................... 320/162
See application file for complete search history.

(56) References Cited

U.S. PATENT DOCUMENTS

| | | | | |
|---|---|---|---|---|
| 12,001,377 | B2 * | 6/2024 | Itakura ................ | G06F 13/4282 |
| 2015/0340890 | A1 * | 11/2015 | Yao .................... | H02M 3/33523 |
| | | | | 320/114 |
| 2017/0336844 | A1 * | 11/2017 | Koga .................... | G06F 1/3296 |
| 2018/0019585 | A1 * | 1/2018 | Koga .................... | H02H 3/087 |

FOREIGN PATENT DOCUMENTS

| | | |
|---|---|---|
| JP | H08-2247 A | 1/1996 |
| JP | 2002-082725 A | 3/2002 |
| JP | 2018-011442 A | 1/2018 |

OTHER PUBLICATIONS

Office Action of corresponding Japanese application JP 2021-151541 mailed Jun. 2, 2025.

* cited by examiner

*Primary Examiner* — Yalkew Fantu
(74) *Attorney, Agent, or Firm* — CHIP LAW GROUP

(57)     ABSTRACT
Disclosed herein is a universal serial bus Type-C port controller mountable in a sink compatible with universal serial bus power delivery, the sink mounted with the universal serial bus port controller including a receptacle including a power supply terminal, a capacitor, a limiting resistance connected between the power supply terminal and the capacitor, and a bypass circuit that is switchable between a bypass state and a non-bypass state, and bypasses the limiting resistance in the bypass state. The universal serial bus Type-C port controller includes a charge control unit that monitors a voltage of the power supply terminal, sets the bypass circuit in the non-bypass state when the voltage of the power supply terminal is lower than a predetermined threshold voltage, and sets the bypass circuit in the bypass state when the voltage of the power supply terminal is higher than the threshold voltage.

18 Claims, 10 Drawing Sheets

100R

F I G. 1

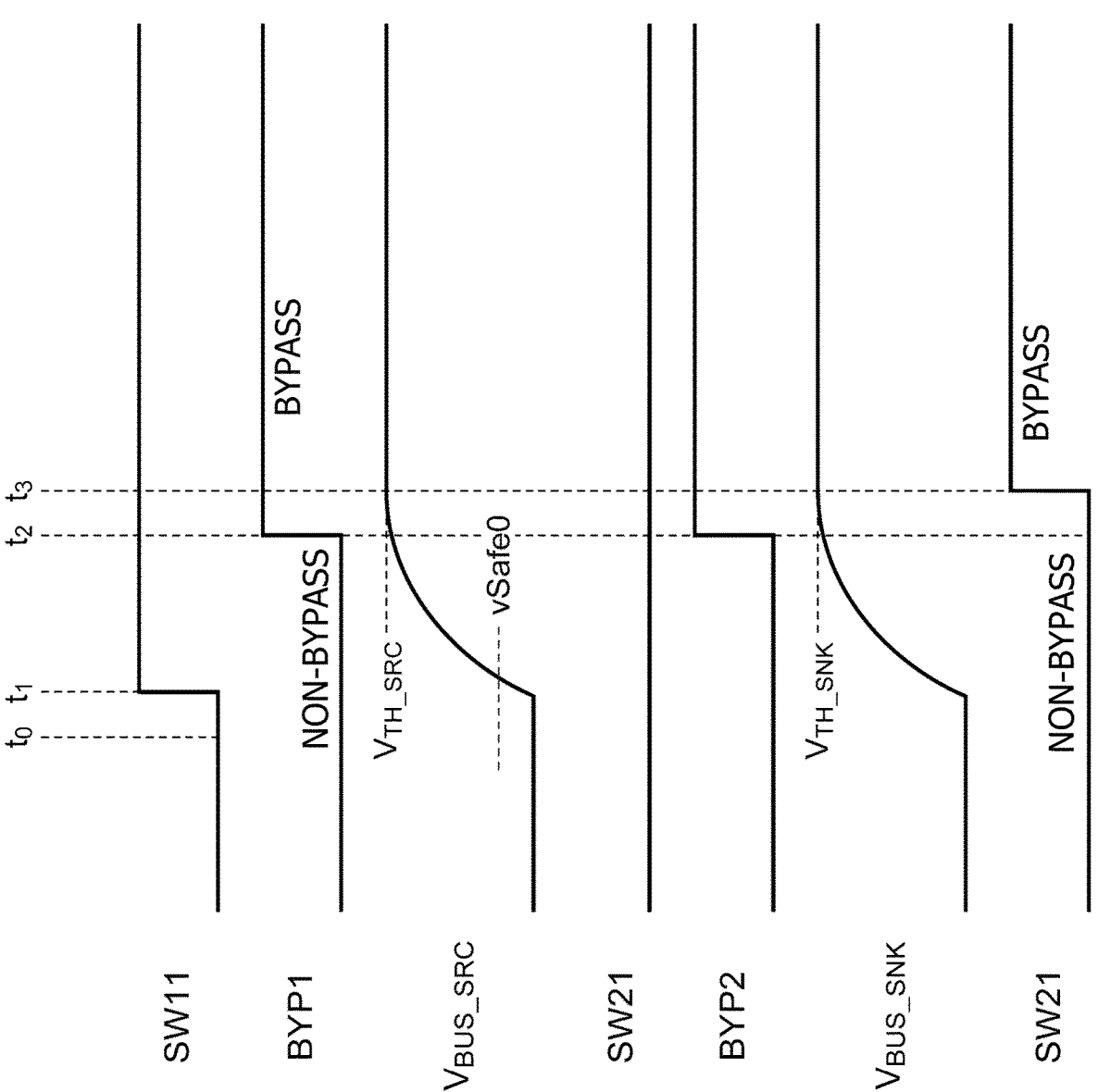
F I G . 4

F I G . 5
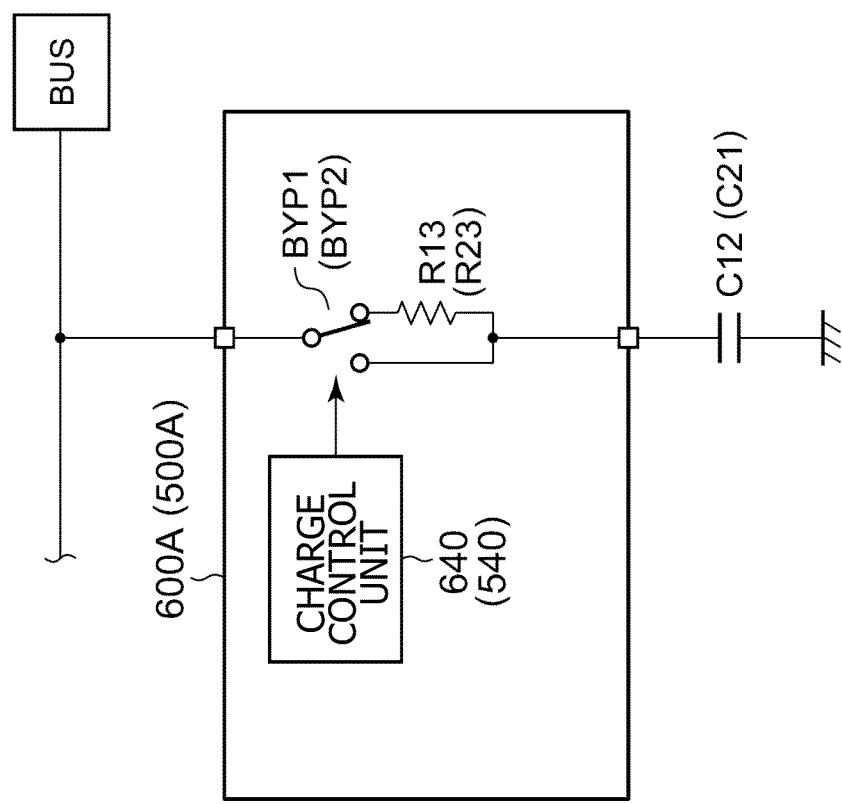

F I G . 6
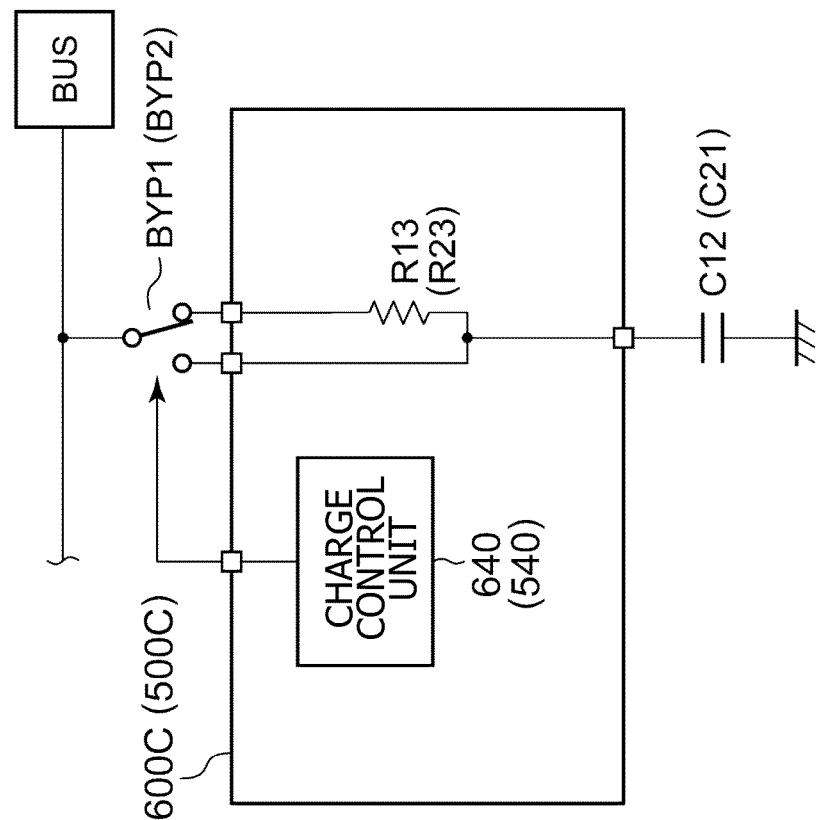

F I G . 8
200D (300D)
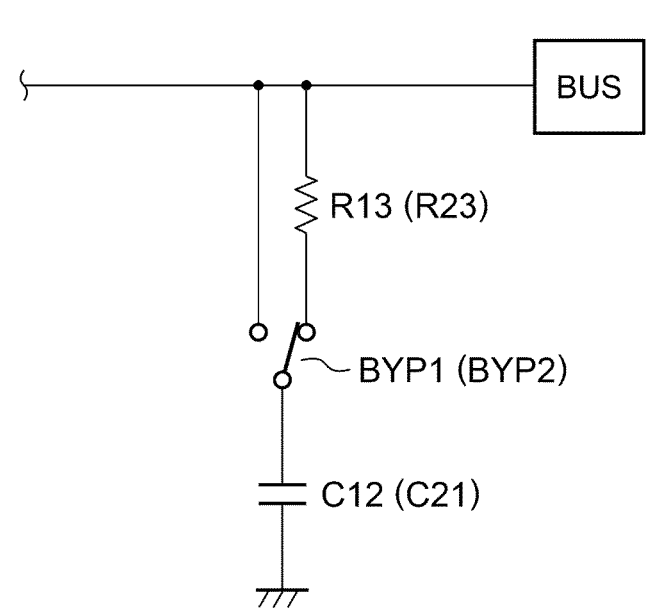
F I G . 9
200E (300E)
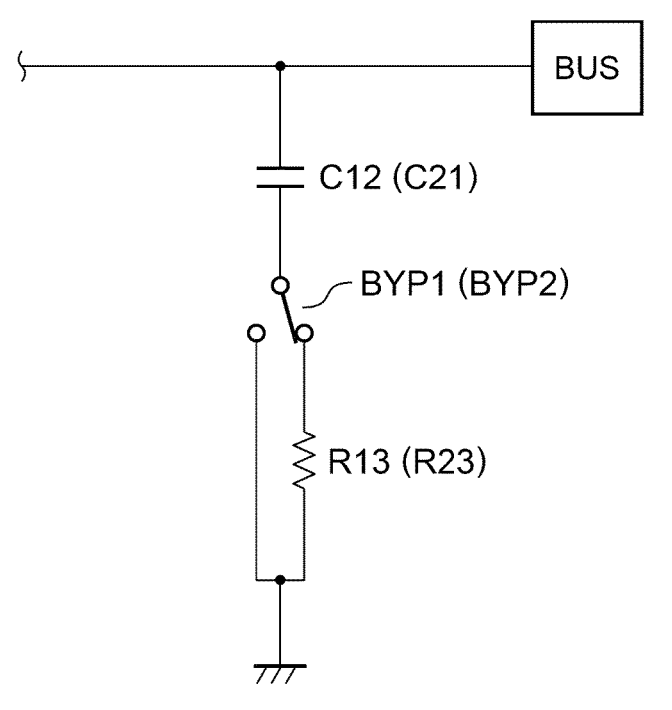

200F (300F)

200G (300G)

200H (300H)

UNIVERSAL SERIAL BUS PORT CONTROLLER AND ELECTRONIC APPARATUS FOR PREVENTING INRUSH CURRENT DURING POWER DELIVERY

CROSS REFERENCE TO RELATED APPLICATIONS

This application claims priority benefit of Japanese Patent Application No. JP 2021-151541 filed in the Japan Patent Office on Sep. 16, 2021. Each of the above-referenced applications is hereby incorporated herein by reference in its entirety.

BACKGROUND

The present disclosure relates to a controller for a universal serial bus (USB) Type-C.

Battery driven devices including smart phones, tablet terminals, notebook computers, portable audio players, and digital cameras include, together with a rechargeable secondary battery, a charging circuit for charging the secondary battery. Some charging circuits charge a secondary battery on the basis of a direct current (DC) voltage (bus voltage $V_{BUS}$) externally supplied via a USB cable or a DC voltage from an external alternating current (AC) adapter.

A standard referred to as USB Power Delivery (which standard will hereinafter be referred to as a USB-PD standard) has been developed as a feeding system by using USB. In the USB-PD standard, suppliable power is greatly increased from 7.5 W of a buttery charging (BC) standard to a maximum of 100 W. Specifically, the USB-PD standard allows the supply of a voltage higher than 5 V (specifically, 9 V, 12 V, 15 V, 20 V, or the like) as a USB bus voltage, and allows the supply of a larger amount as a charging current (specifically, 2 A, 3 A, 5 A, or the like) than in the BC standard. The USB-PD standard operates on a USB Type-C standard.

Figure 1:
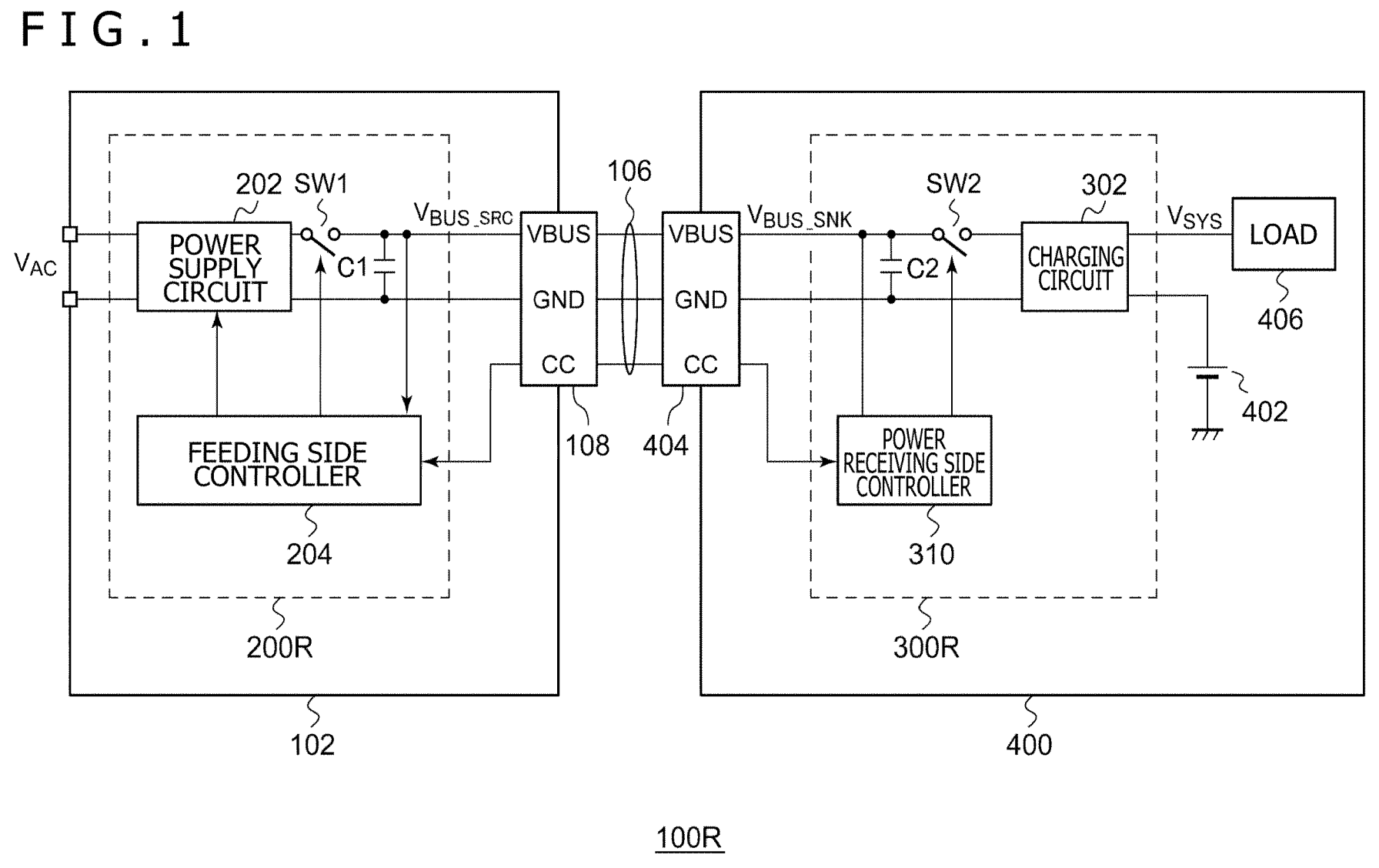

FIG. 1 is a block diagram of a feeding system 100R. This feeding system 100R is compliant with the USB Type-C standard. The feeding system 100R includes a feeding device (referred to also as a source or a host) 200R and a power receiving device (referred to also as a sink or a device) 300R connected to each other via a USB cable 106.

The feeding device 200R is included in an electronic apparatus 102. The electronic apparatus 102 may be an AC adapter. The power receiving device 300R is included in a battery driven electronic apparatus 400 such as a smart phone, a tablet terminal, a digital camera, a digital video camera, a portable audio player, or other devices.

The feeding device 200R includes a power supply circuit 202, a feeding side power delivery (PD) controller (hereinafter referred to as a feeding side controller) 204, and a bus switch SW1. The USB cable 106 is detachably connected to a receptacle 108 of the electronic apparatus 400. Incidentally, there is also a charge adapter in which the receptacle 108 is omitted, and the USB cable 106 is integral with the electronic apparatus 102.

The receptacle 108 includes a VBUS terminal for supplying a bus voltage $V_{BUS}$, a GND terminal for supplying a ground voltage $V_{GND}$, and a configuration channel (CC) port. In actuality, two CC ports are provided. However, the CC ports are depicted in a simplified manner as one CC port in FIG. 1. The power supply circuit 202 generates the bus voltage $V_{BUS}$. The power supply circuit 202 may include an AC/DC converter that receives AC 100 V from an external power supply (for example, a commercial alternating-current power supply) not depicted, and converts AC 100 V into a direct-current bus voltage $V_{BUS}$. The bus voltage $V_{BUS}$ generated by the power supply circuit 202 is supplied to the power receiving device 300R via a bus line of the USB cable 106 and the bus switch SW1.

The feeding side controller 204 and a power receiving side controller 310 are each a port controller for USB Type-C. The feeding side controller 204 and the power receiving side controller 310 are connected to each other via a CC line, and provide a communicating function. The feeding side controller 204 and the power receiving side controller 310 negotiate a voltage level of the bus voltage $V_{BUS}$ to be supplied by the feeding device 200R. The feeding side controller 204 controls the power supply circuit 202 so as to provide the determined voltage level, and performs on-off control of the bus switch SW1.

The electronic apparatus 400 includes a battery 402, a receptacle 404, a load (system) circuit 406, and the power receiving device 300R. The battery 402 is a rechargeable secondary battery. The load circuit 406 includes a CPU, a memory, a liquid crystal display, an audio circuit, and the like. The electronic apparatus 102 is detachably connected to the receptacle 404 via the USB cable 106.

The power receiving device 300R receives power from the electronic apparatus 102 and charges a charging circuit 302. The power receiving device 300R includes the charging circuit 302, the power receiving side controller 310, and a bus switch SW2.

The charging circuit 302 receives the bus voltage $V_{BUS}$ from the feeding device 200R (on the power receiving device 300R side, the bus voltage $V_{BUS}$ will be described as the bus voltage $V_{BUS\_SNK}$) via the USB cable 106 and the bus switch SW2, and charges the battery 402. The charging circuit 302 is constituted by a step-down DC/DC converter, a linear regulator, or a combination thereof.

A system voltage $V_{SYS}$ corresponding to at least one of the bus voltage $V_{BUS\_SNK}$ and a voltage $V_{BAT}$ of the battery 402 is supplied from the charging circuit 302 to the load circuit 406. The load circuit 406 includes a multi-channel power supply including a power management integrated circuit (IC), a DC/DC converter, a linear regulator, and the like, a microcomputer, a liquid crystal display, a display driver, and the like.

Data (power data object (PDO)) that defines the bus voltage $V_{BUS}$ requested by the power receiving device 300R and a maximum current is defined in the power receiving side controller 310. When the electronic apparatus 102 and the electronic apparatus 400 are connected to each other, the feeding side controller 204 and the power receiving side controller 310 perform negotiation, and determine the voltage level of the bus voltage $V_{BUS}$ on the basis of the PDO. In addition, the power receiving side controller 310 performs on-off control of the bus switch SW2.

FIG. 2 is an operation sequence diagram of the feeding system 100R in FIG. 1. When the feeding device 200R and the power receiving device 300R are connected to each other via the USB cable 106, the feeding side controller 204 detects the connection on the basis of the state of the CC port (S100). Specifically, the power receiving side controller 310 of the power receiving device 300R waits in a state in which the CC port is pulled down by a pull-down resistance (terminating resistance) Rd having a predetermined resistance value. When the feeding device 200R and the power receiving device 300R are connected to each other, a voltage corresponding to the pull-down resistance Rd on the power receiving device 300R side and the state of the feeding device 200R itself occurs at the CC port of the feeding device 200R. The feeding side controller 204 of the feeding device 200R can thus detect the connection of the power receiving device 300R (electronic apparatus 400).

Detecting the connection of the power receiving device 300R, the feeding device 200R turns on the bus switch SW1 (S102) and supplies a default bus voltage $V_{BUS}$ of 5 V on condition that the voltage of the $V_{BUS}$ terminal of the feeding device 200R itself is lower than a voltage level referred to as vSafe0V. The power receiving side controller 310 becomes operable when the bus switch SW1 is turned on. In the standard, vSafe0V is defined between 0.0 and 0.8 V.

Next, the feeding side controller 204 and the power receiving side controller 310 perform negotiation and determine the bus voltage $V_{BUS}$ (S104). The feeding side controller 204 changes the bus voltage $V_{BUS}$ from an initial voltage of 5 V to the requested voltage (S106).

When the changing of the bus voltage $V_{BUS}$ to the requested voltage is completed, the completion is notified from the feeding side controller 204 to the power receiving side controller 310 (S108). In response to this notification, the power receiving side controller 310 turns on the bus switch SW2 (S110). The bus voltage $V_{BUS}$ is thereby supplied to the charging circuit 302 and the load circuit 406 (S112).

SUMMARY

The present inventor has investigated connection between a source and a sink of a USB Type-C, and has identified the following problems.

The USB Type-C standard specifies that a capacitor C1 higher than 10 pF be connected to the VBUS terminal of the source. In addition, the USB Type-C standard specifies that a capacitor C2 of 1 to 10 pF be connected also to the VBUS terminal of the sink. In a dual role power (DRP) switchable between the source and the sink, a capacitor C1 higher than 10 pF needs to be connected to the $V_{BUS}$ terminal.

When the power supply circuit 202 starts generating a power supply voltage $V_{BUS}$ of 5 V and the bus switch SW1 is turned on after the source and the sink are connected to each other by the USB cable, an inrush current flows through the capacitor C1 on the source side and the capacitor C2 on the sink side.

A certain aspect of the present disclosure has been made in view of such problems. It is desirable to provide a system that can prevent an inrush current into the capacitors after the source and the sink are connected to each other.

A certain aspect of the present disclosure relates to a USB port controller mountable in a sink compatible with USB-PD. The sink mounted with the USB port controller includes a receptacle including a power supply terminal, a capacitor, a limiting resistance connected between the power supply terminal and the capacitor, and a bypass circuit that is switchable between a bypass state and a non-bypass state, and bypasses the limiting resistance in the bypass state. The USB port controller includes a charge control unit that monitors a voltage of the power supply terminal, sets the bypass circuit in the non-bypass state when a voltage of the power supply terminal is lower than a predetermined threshold voltage, and sets the bypass circuit in the bypass state when the voltage of the power supply terminal is higher than the threshold voltage.

Another aspect of the present disclosure relates to an electronic apparatus as a sink compatible with USB-PD. This electronic apparatus includes a USB receptacle including a power supply terminal, an internal circuit, a capacitor, an input switch connected between the power supply terminal and the internal circuit, a limiting resistance connected between the power supply terminal and the capacitor, a bypass circuit that is switchable between a bypass state and a non-bypass state, and bypasses the limiting resistance in the bypass state, and a USB port controller that monitors a voltage of the power supply terminal, sets the bypass circuit in the non-bypass state when the voltage of the power supply terminal is lower than a predetermined threshold voltage, and sets the bypass circuit in the bypass state when the voltage of the power supply terminal is higher than the threshold voltage.

Yet another aspect of the present disclosure relates to a USB port controller mountable in a source compatible with USB Type-C. The source mounted with the USB port controller includes a receptacle having a power supply terminal and a CC terminal, a power supply circuit, an output switch disposed between the power supply circuit and the power supply terminal, a capacitor, a limiting resistance connected between the power supply terminal and the capacitor, and a bypass circuit that is switchable between a bypass state and a non-bypass state, and bypasses the limiting resistance in the bypass state. The USB port controller includes a charge control unit that monitors a voltage of the power supply terminal, sets the bypass circuit in the non-bypass state when the voltage of the power supply terminal is lower than a predetermined threshold voltage, and sets the bypass circuit in the bypass state when the voltage of the power supply terminal is higher than the threshold voltage, and a switch control unit that controls the output switch on a basis of a state of the CC terminal.

Yet another aspect of the present disclosure relates to an electronic apparatus as a source compatible with USB Type-C. The electronic apparatus includes a receptacle having a power supply terminal and a CC terminal, a power supply circuit, an output switch disposed between the power supply circuit and the power supply terminal, a capacitor, a limiting resistance connected between the power supply terminal and the capacitor, a bypass circuit that is switchable between a bypass state and a non-bypass state, and bypasses the limiting resistance in the bypass state, and a USB port controller that monitors a voltage of the power supply terminal, sets the bypass circuit in the non-bypass state when the voltage of the power supply terminal is lower than a predetermined threshold voltage, sets the bypass circuit in the bypass state when the voltage of the power supply terminal is higher than the threshold voltage, and controls the output switch on a basis of a state of the CC terminal.

According to a certain aspect of the present disclosure, it is possible to prevent an inrush current into the capacitors after the source and the sink are connected to each other, and also reduce a loss after a start of feeding.

BRIEF DESCRIPTION OF THE DRAWINGS

FIG. 1 is a block diagram of a feeding system;

FIG. 4 is a diagram of assistance in explaining operation at a time of connection between a feeding device and a power receiving device in the feeding system of FIG. 3;

FIG. 5 is a circuit diagram of a part of a feeding device according to a first modification;

FIG. 6 is a circuit diagram of a part of a feeding device according to a second modification;

FIG. 8 is a circuit diagram of a part of a feeding device according to a fourth modification;

FIG. 9 is a circuit diagram of a part of a feeding device according to a fifth modification;

DETAILED DESCRIPTION OF THE PREFERRED EMBODIMENTS

Outline of Embodiments

Figure 2:
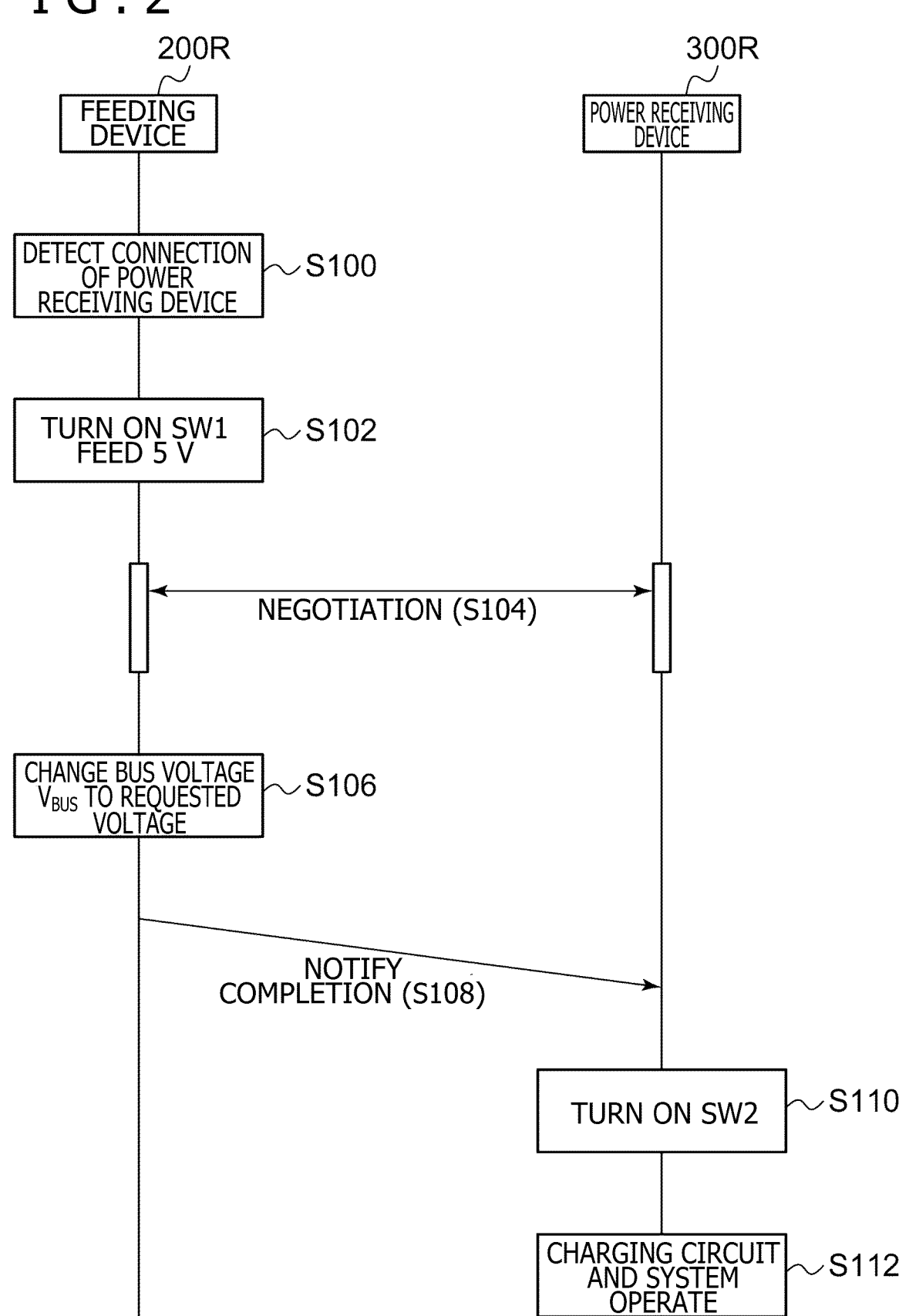
FIG. 2 is an operation sequence diagram of the feeding system in FIG. 1.

An outline of a few illustrative embodiments of the present disclosure will be described. This outline describes, in a simplified manner, a few concepts of one or a plurality of embodiments as an introduction to the following detailed description for a purpose of basic understanding of the embodiments, and does not limit the scope of the disclosure or the disclosure. This outline is neither a comprehensive outline of all conceivable embodiments nor intended to identify important elements of all of the embodiments or demarcate the scope of a part or all of aspects. For convenience, "one embodiment" may be used to refer to one embodiment (an example or a modification) or a plurality of embodiments (examples or modifications) disclosed in the present specification.

A USB port controller according to one embodiment is mountable in a sink compatible with USB-PD. The sink mounted with the USB port controller includes a receptacle including a power supply terminal, a capacitor, a limiting resistance connected between the power supply terminal and the capacitor, and a bypass circuit that is switchable between a bypass state and a non-bypass state, and bypasses the limiting resistance in the bypass state. The USB port controller includes a charge control unit that monitors a voltage of the power supply terminal, sets the bypass circuit in the non-bypass state when the voltage of the power supply terminal is lower than a predetermined threshold voltage, and sets the bypass circuit in the bypass state when the voltage of the power supply terminal is higher than the threshold voltage.

According to this configuration, in a situation in which the voltage of the capacitor, that is, the voltage of the power supply terminal is low, and an inrush current can occur, the inrush current can be prevented by setting the bypass circuit in the non-bypass state. In a situation in which the charging of the capacitor is completed, the voltage of the power supply terminal has become sufficiently high, and the inrush current does not occur, a loss due to the limiting resistance during normal feeding can be reduced by setting the bypass circuit in the bypass state.

In one embodiment, the bypass circuit may include a selector having a first terminal, a second terminal, and a third terminal, the first terminal being connected to the power supply terminal, the second terminal being connected to the capacitor, and the third terminal being connected to the limiting resistance. Conduction may occur between the first terminal and the second terminal in the bypass state, and conduction may occur between the first terminal and the third terminal in the non-bypass state.

In one embodiment, one end of the limiting resistance may be connected to the power supply terminal, and another end of the limiting resistance may be connected to the capacitor. The bypass circuit may include a first switch connected in parallel with the limiting resistance. The first switch may be on in the bypass state and may be off in the non-bypass state.

In one embodiment, the bypass circuit may further include a second switch connected between the power supply terminal and the capacitor and in series with the limiting resistance. The second switch may be off in the bypass state, and the second switch may be on in the non-bypass state.

In one embodiment, the bypass circuit may be included in the USB port controller.

In one embodiment, the limiting resistance may be included in the USB port controller.

In one embodiment, the USB port controller may be integrally integrated on one semiconductor substrate. "Integrally integrated" includes a case where all of circuit constituent elements are formed on the semiconductor substrate and a case where main circuit constituent elements are integrally integrated. A part of resistances, capacitors, and the like may be provided on the outside of the semiconductor substrate for adjustment of circuit constants. Integrating the circuit on one chip can reduce a circuit area, and hold characteristics of the circuit elements uniform.

An electronic apparatus according to one embodiment includes a USB receptacle including a power supply terminal, an internal circuit, a capacitor, an input switch connected between the power supply terminal and the internal circuit, a limiting resistance connected between the power supply terminal and the capacitor, a bypass circuit that is switchable between a bypass state and a non-bypass state, and bypasses the limiting resistance in the bypass state, and a USB port controller that monitors a voltage of the power supply terminal, sets the bypass circuit in the non-bypass state when the voltage of the power supply terminal is lower than a predetermined threshold voltage, and sets the bypass circuit in the bypass state when the voltage of the power supply terminal is higher than the threshold voltage.

According to this configuration, in a situation in which the voltage of the capacitor, that is, the voltage of the power supply terminal is low, and an inrush current can occur, the inrush current can be prevented by setting the bypass circuit in the non-bypass state. In a situation in which the charging of the capacitor is completed, the voltage of the power supply terminal has become sufficiently high, and the inrush current does not occur, a loss due to the limiting resistance during normal feeding can be reduced by setting the bypass circuit in the bypass state.

A USB port controller according to one embodiment is mountable in a source compatible with USB Type-C. The source mounted with the USB port controller includes a receptacle having a power supply terminal and a CC terminal, a power supply circuit, an output switch disposed between the power supply circuit and the power supply terminal, a capacitor, a limiting resistance connected between the power supply terminal and the capacitor, and a bypass circuit that is switchable between a bypass state and a non-bypass state, and bypasses the limiting resistance in the bypass state. The USB port controller includes a charge control unit that monitors a voltage of the power supply terminal, sets the bypass circuit in the non-bypass state when the voltage of the power supply terminal is lower than a predetermined threshold voltage, and sets the bypass circuit in the bypass state when the voltage of the power supply terminal is higher than the threshold voltage, and a switch control unit that controls the output switch on a basis of a state of the CC terminal.

According to this configuration, in a situation in which the voltage of the capacitor, that is, the voltage of the power supply terminal is low, and an inrush current can occur, the inrush current can be prevented by setting the bypass circuit in the non-bypass state. In a situation in which the charging of the capacitor is completed, the voltage of the power supply terminal has become sufficiently high, and the inrush current does not occur, a loss due to the limiting resistance during normal feeding can be reduced by setting the bypass circuit in the bypass state.

In one embodiment, the bypass circuit may include a selector having a first terminal, a second terminal, and a third terminal, the first terminal being connected to the power supply terminal, the second terminal being connected to the capacitor, and the third terminal being connected to the limiting resistance. Conduction may occur between the first terminal and the second terminal in the bypass state, and conduction may occur between the first terminal and the third terminal in the non-bypass state.

In one embodiment, one end of the limiting resistance may be connected to the power supply terminal, and another end of the limiting resistance may be connected to the capacitor. The bypass circuit may include a first switch connected in parallel with the limiting resistance. The first switch may be on in the bypass state and may be off in the non-bypass state.

In one embodiment, the bypass circuit may further include a second switch connected between the power supply terminal and the capacitor and in series with the limiting resistance. The second switch may be off in the bypass state, and the second switch may be on in the non-bypass state.

In one embodiment, the bypass circuit may be included in the USB port controller.

In one embodiment, the limiting resistance may be included in the USB port controller.

In one embodiment, the USB port controller may be integrally integrated on one semiconductor substrate.

An electronic apparatus according to one embodiment includes a receptacle having a power supply terminal and a CC terminal, a power supply circuit, an output switch disposed between the power supply circuit and the power supply terminal, a capacitor, a limiting resistance connected between the power supply terminal and the capacitor, a bypass circuit that is switchable between a bypass state and a non-bypass state, and bypasses the limiting resistance in the bypass state, and a USB port controller that monitors a voltage of the power supply terminal, sets the bypass circuit in the non-bypass state when the voltage of the power supply terminal is lower than a predetermined threshold voltage, sets the bypass circuit in the bypass state when the voltage of the power supply terminal is higher than the threshold voltage, and controls the output switch on a basis of a state of the CC terminal.

Embodiment

A preferred embodiment will hereinafter be described with reference to the drawings. Identical or equivalent constituent elements, members, and processing depicted in each drawing are identified by the same reference numerals, and repeated description thereof will be omitted as appropriate. In addition, the embodiment is not restrictive of the disclosure and the disclosure but is illustrative, and all features described in the embodiment and combinations thereof are not necessarily substantial to the disclosure and the technology.

In the present specification, a "state in which a member A is connected to a member B" includes a case where the member A and the member B are physically directly connected to each other and also a case where the member A and the member B are indirectly connected to each other via another member that does not substantially affect a state of electric connection between the member A and the member B or does not impair functions or effects produced by the coupling of the member A and the member B.

Similarly, a "state in which a member C is connected (provided) between the member A and the member B" includes a case where the member A and the member C or the member B and the member C are directly connected to each other and also a case where the member A and the member C or the member B and the member C are indirectly connected to each other via another member that does not substantially affect a state of electric connection between the member A and the member C or the member B and the member C or does not impair functions or effects produced by the coupling of the member A and the member C or the member B and the member C.

Figure 3:
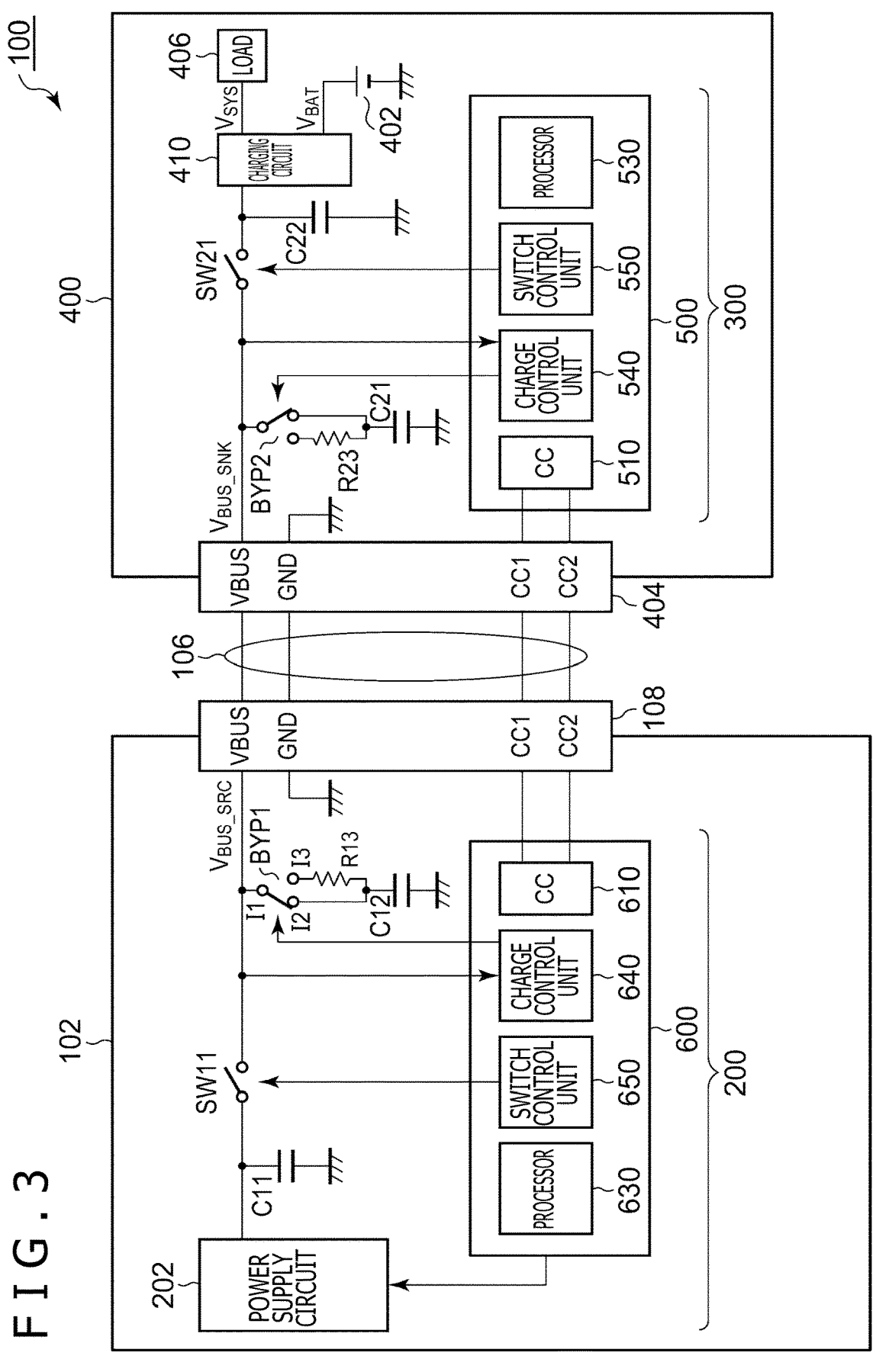
FIG. 3 is a block diagram of a feeding system according to an embodiment.

FIG. 3 is a block diagram of a feeding system 100 according to an embodiment. The feeding system 100 is compliant with a USB Type-C standard. The feeding system 100 includes a feeding device (referred to also as a source) 200 and a power receiving device (referred to also as a sink) 300. The feeding device 200 and the power receiving device 300 are connected to each other via a USB cable 106.

The feeding device 200 is, for example, included in an electronic apparatus 102. The electronic apparatus 102 may be an AC adapter. The power receiving device 300 is included in a battery driven type electronic apparatus 400 such as a smart phone, a tablet terminal, a digital camera, a digital video camera, a portable audio player, or other devices.

A configuration of the source side, that is, the electronic apparatus 102 side will first be described.

The electronic apparatus 102 includes the feeding device 200 and a receptacle 108. The feeding device 200 includes a power supply circuit 202, a feeding side PD controller (hereinafter referred to as a feeding side controller) 600, an output switch (bus switch) SW11, capacitors C11 and C12, a limiting resistance R13, and a bypass circuit BYP1. The USB cable 106 is detachably connected to the receptacle 108 of the electronic apparatus 400. Incidentally, there is also a charge adapter in which the receptacle 108 is omitted, and the USB cable 106 is integral with the electronic apparatus 102.

The receptacle 108 includes a VBUS terminal for supplying a bus voltage $V_{BUS}$, a GND terminal for supplying a ground voltage $V_{GND}$ (0 V), and CC ports.

The capacitor C12 is connected to the power supply terminal VBUS via the limiting resistance R13. The bypass circuit BYP1 is switchable between a bypass state and a non-bypass state, and bypasses the limiting resistance R13 in the bypass state. The bypass circuit BYP1 in the present embodiment is a selector having a first to a third terminal I1 to I3. The first terminal I1 is connected to the VBUS terminal. The second terminal I2 is connected to the capacitor C12. The third terminal I3 is connected to the limiting resistance R13. Conduction occurs between the first terminal I1 and the second terminal I2 in the bypass state, and conduction occurs between the first terminal I1 and the third terminal I3 in the non-bypass state.

The power supply circuit 202 generates the bus voltage $V_{BUS}$. The power supply circuit 202 may include an AC/DC converter that receives AC 100 V from an external power supply (for example, a commercial alternating-current power supply) not depicted, and converts AC 100 V into a direct-current bus voltage $V_{BUS}$. The bus voltage $V_{BUS}$ generated by the power supply circuit 202 is supplied to the power receiving device 300 via a bus line of the USB cable 106 and the output switch SW11.

The USB port controller 600 is a port controller for USB Type-C and USB-PD. The USB port controller 600 and a USB port controller 500 are connected to each other via CC lines.

The USB port controller 600 includes a CC pin circuit 610, a processor 630, a charge control unit 640, and a switch control unit 650. The USB port controller 600 is a functional IC integrated on one semiconductor substrate.

The CC pin circuit 610 includes a pull-up resistance that pulls up CC pins. It is declared by this pull-up resistance that the feeding device 200 is the source. In a case where the feeding device 200 is a DRP that allows switching between the sink and the source, the CC pin circuit 610 is configured to be switchable between a state in which the CC pins are pulled down (that is, the sink) and a state in which the CC pins are pulled up (that is, the source).

The CC pin circuit 610 includes a comparator or the like that compares the voltages of the CC pins with a threshold voltage. It is detected on the basis of an output of this comparator that the power receiving device 300 is connected via the USB cable 106.

In addition, the USB port controller 500 and the USB port controller 600 can communicate with each other via the CC lines. A transceiver for communication is included in the CC pin circuit 610.

The USB port controller 600 and the USB port controller 500 negotiate the voltage level of the bus voltage $V_{BUS}$ to be supplied by the feeding device 200. The USB port controller 600 controls the power supply circuit 202 so as to provide the determined voltage level, and performs on-off control of the output switch SW11. The processor 630 executes a software program, and thereby performs negotiation with the USB port controller 500. The processor 630 may be a microcontroller independent of the USB port controller 600.

After the switch control unit 650 detects the connection of the power receiving device 300, the switch control unit 650 turns on the output switch SW11 on condition that the bus voltage (output voltage) $V_{BUS\_SRC}$ of the VBUS terminal is lower than a predetermined threshold value vSafe0V. In addition, the switch control unit 650 turns off the output switch SW11 when the feeding device 200 and the power receiving device 300 are disconnected from each other.

The switch control unit 650 controls the bypass circuit BYP1 on the basis of the bus voltage $V_{BUS\_SRC}$ of the VBUS terminal. The switch control unit 650 holds the bypass circuit BYP1 in the non-bypass state until the bus voltage $V_{BUS\_SRC}$ reaches a predetermined threshold voltage $V_{TH\_SRC}$ set in the vicinity of 5 V after the switch control unit 650 turns on the output switch SW11. The switch control unit 650 switches the bypass circuit BYP1 to the non-bypass state when the bus voltage $V_{BUS\_SRC}$ reaches the threshold value $V_{TH\_SRC}$.

A configuration on the source side has been described above.

A configuration of the sink side, that is, the electronic apparatus 400 will next be described.

The electronic apparatus 400 includes a battery 402, a receptacle 404, a load (system) circuit 406, and the power receiving device 300. The battery 402 is a rechargeable secondary battery. The load circuit 406 includes a CPU, a memory, a liquid crystal display, an audio circuit, and the like. The electronic apparatus 102 is detachably connected to the receptacle 404 via the USB cable 106.

The power receiving device 300 receives power from the electronic apparatus 102 and charges a charging circuit 410. The power receiving device 300 includes the charging circuit 410, the USB port controller 500, an input switch (bus switch) SW21, capacitors C21 and C22, a limiting resistance R23, and a bypass circuit BYP2.

The charging circuit 410 receives the bus voltage $V_{BUS}$ from the feeding device 200 via the USB cable 106 and the input switch SW21, and charges the battery 402. On the power receiving device 300 side, the bus voltage $V_{BUS}$ will be referred to also as an input voltage, and described as $V_{BUS\_SNK}$. The charging circuit 410 is constituted by a step-down DC/DC converter, a linear regulator, or a combination thereof.

A system voltage $V_{SYS}$ corresponding to at least one of the bus voltage $V_{BUS\_SNK}$ and a voltage $V_{BAT}$ of the battery 402 is supplied from the charging circuit 410 to the load circuit 406. The load circuit 406 includes a multi-channel power supply including a power management IC, a DC/DC converter, a linear regulator, and the like, a microcomputer, a liquid crystal display, a display driver, and the like.

The capacitors C21 and C22 are connected to both ends of the input switch SW21. The capacitor C21 is connected to the VBUS terminal via the limiting resistance R23. The bypass circuit BYP2 is switchable between a bypass state and a non-bypass state, and bypasses the limiting resistance R23 in the bypass state. The bypass circuit BYP2 in the present embodiment has a similar configuration to that of the bypass circuit BYP1.

The USB port controller 500 includes a CC pin circuit 510, a processor 530, a charge control unit 540, and a switch control unit 550. The USB port controller 500 is a functional IC integrated on one semiconductor substrate. The CC pin circuit 510 includes a pull-down resistance that pulls down the CC pins. Incidentally, in a case where the power receiving device 300 is a DRP that allows switching between the sink and the source, the CC pin circuit 510 is configured to be switchable between a state in which the CC pins are pulled down (that is, the sink) and a state in which the CC pins are pulled up (that is, the source).

As described above, the USB port controller 500 performs negotiation with the USB port controller 600 via the CC lines. A transceiver for communication via the CC lines is included in the CC pin circuit 510.

Data (PDO) that defines the bus voltage $V_{BUS}$ requested by the power receiving device 300 and a maximum current is defined in the USB port controller 500. When the electronic apparatus 102 and the electronic apparatus 400 are connected to each other, the USB port controller 600 and the USB port controller 500 perform negotiation, and determine the voltage level of the bus voltage $V_{BUS}$ on the basis of the PDO. In addition, the USB port controller 500 performs on-off control of the input switch SW21. The processor 530 executes a software program and thereby performs negotiation with the USB port controller 600. The processor 530 may be a microcontroller independent of the USB port controller 500.

The switch control unit 550 controls the bypass circuit BYP2 on the basis of the bus voltage $V_{BUS\_SRC}$ of the VBUS terminal. The switch control unit 550 sets the bypass circuit BYP2 in the non-bypass state when the bus voltage $V_{BUS\_SNK}$ is lower than a predetermined threshold voltage $V_{TH\_SNK}$ set in the vicinity of 5 V after the electronic apparatus 102 is connected. The switch control unit 550 switches the bypass circuit BYP1 to the non-bypass state when the bus voltage $V_{BUS\_SNK}$ reaches the threshold value $V_{TH\_SNK}$.

The switch control unit 550 turns on the input switch SW21 after the bypass circuit BYP2 is switched to the non-bypass state. In addition, the switch control unit 550 turns off the input switch SW21 when the feeding device 200 and the power receiving device 300 are disconnected from each other.

A configuration of the feeding system 100 has been described above. Operation thereof will next be described.

FIG. 4 is a diagram of assistance in explaining operation at a time of connection between the feeding device 200 and the power receiving device 300 in the feeding system 100 of FIG. 3.

Before time to, the power receiving device 300 and the feeding device 200 are disconnected from each other. At time to, the power receiving device 300 and the feeding device 200 are connected to each other via the USB cable 106. The USB port controller 600 of the feeding device 200 detects on the basis of the state of CC ports that the power receiving device 300 is connected.

In this state, the bus voltage $V_{BUS\_SRC}$ is lower than the threshold voltage $V_{TH\_SRC}$, and therefore the charge control unit 640 holds the bypass circuit BYP1 in the non-bypass state. That is, the capacitor C12 is connected to the VBUS terminal via the limiting resistance R13.

In addition, on the power receiving device 300 side, the bus voltage $V_{BUS\_SNK}$ is lower than the threshold voltage $V_{TH\_SNK}$, and therefore the charge control unit 540 holds the bypass circuit BYP2 in the non-bypass state. That is, the capacitor C21 is connected to the VBUS terminal via the limiting resistance R23.

At time $t_1$, when the switch control unit 650 of the USB port controller 600 detects that the voltage $V_{BUS\_SRC}$ is lower than the threshold value vSafe0V, the switch control unit 650 turns on the output switch SW11. Thus, the capacitor C12 is charged via the limiting resistance R13, and the capacitor C21 is charged via the limiting resistance R23. An inrush current is thereby prevented, and the bus voltages $V_{BUS\_SRC}$ and $V_{BUS\_SNK}$ increase slowly. Here, suppose that the impedance of the USB cable 106 is sufficiently low, and that the bus voltages $V_{BUS\_SRC}$ and $V_{BUS\_SNK}$ are equal to each other.

Then, when the bus voltage $V_{BUS\_SRC}$ exceeds the threshold value $V_{TH\_SRC}$ at time $t_2$, the charge control unit 640 switches the bypass circuit BYP1 to the bypass state. In addition, when the bus voltage $V_{BUS\_SNK}$ exceeds the threshold value $V_{TH\_SNK}$, the charge control unit 540 switches the bypass circuit BYP2 to the bypass state.

Next, the switch control unit 550 turns on the input switch SW21 at time $t_3$. After time $t_3$, feeding from the feeding device 200 to the power receiving device 300 is started.

Operation of the feeding system 100 has been described above.

In the feeding device 200, after the output switch SW11 is turned on, the capacitor C12 is charged via the limiting resistance R13. An inrush current can be thereby prevented. In addition, after a start of the feeding from time $t_3$, the limiting resistance R13 is bypassed by the bypass circuit BYP1, so that a power loss can be reduced.

Also in the power receiving device 300, after the output switch SW11 is turned on, the capacitor C21 is charged via the limiting resistance R23. An inrush current can be thereby prevented. In addition, after the start of the feeding from time $t_3$, the limiting resistance R23 is bypassed by the bypass circuit BYP2, so that a power loss can be reduced.

(Modifications)

Modifications will next be described.

(First Modification)

FIG. 5 is a circuit diagram of a part of a feeding device 200A according to a first modification. In this modification, the bypass circuit BYP1 and the limiting resistance R13 are integrated in a USB port controller 600A. A similar modification can be considered for a power receiving device 300A, in which the bypass circuit BYP2 and the limiting resistance R23 can be integrated in a USB port controller 500A.

(Second Modification)

FIG. 6 is a circuit diagram of a part of a feeding device 200B according to a second modification. In this modification, the limiting resistance R13 is integrated in a USB port controller 600B, and the bypass circuit BYP1 is externally attached to the USB port controller 600B. A similar modification can be considered for a power receiving device 300B, in which the limiting resistance R23 can be integrated in a USB port controller 500B, and the bypass circuit BYP2 can be externally attached to the USB port controller 500B.

(Third Modification)

Figure 7:
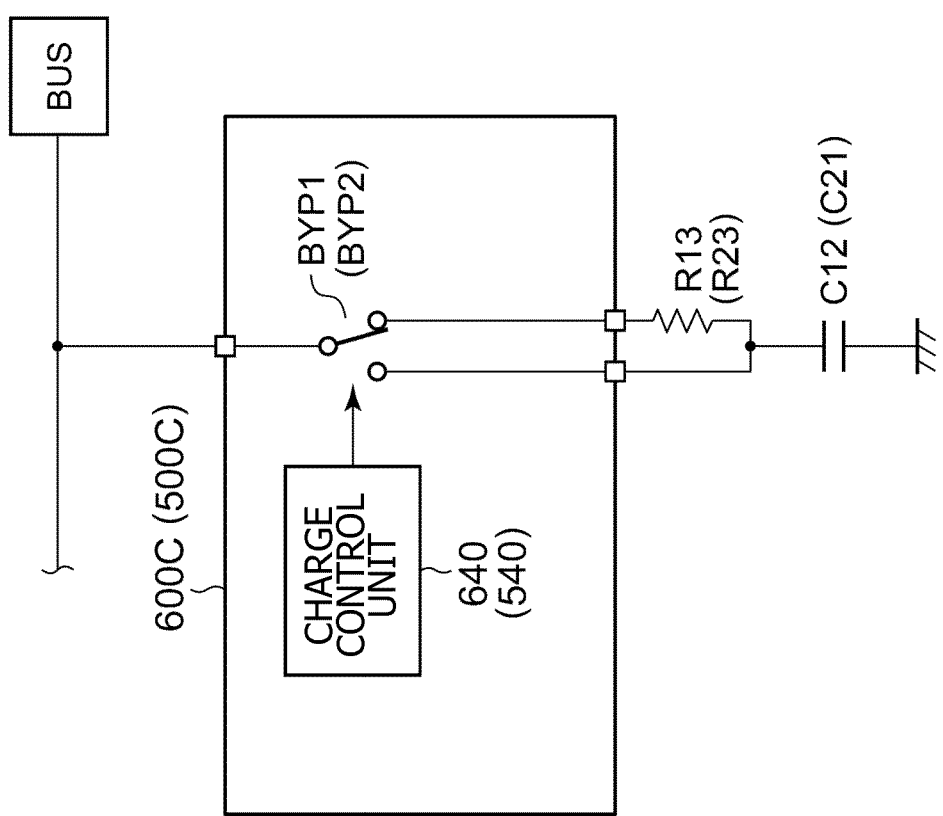
FIG. 7 is a circuit diagram of a part of a feeding device according to a third modification.

FIG. 7 is a circuit diagram of a part of a feeding device 200C according to a third modification. In this modification, the bypass circuit BYP1 is integrated in a USB port controller 600C, and the limiting resistance R13 is externally attached to the USB port controller 600C. A similar modification can be considered for a power receiving device 300C, in which the bypass circuit BYP2 can be integrated in a USB port controller 500C, and the limiting resistance R23 can be externally attached to the USB port controller 500C.

(Fourth Modification)

FIG. 8 is a circuit diagram of a part of a feeding device 200D according to a fourth modification. In this modification, the positions of the limiting resistance R13 and the bypass circuit BYP1 are interchanged. A similar modification can be considered for a power receiving device 300D, in which the limiting resistance R23 and the bypass circuit BYP2 can be interchanged.

(Fifth Modification)

FIG. 9 is a circuit diagram of a part of a feeding device 200E according to a fifth modification. In this modification, the capacitor C12 is provided on a higher potential side than the bypass circuit BYP1 and the limiting resistance R13. A similar modification can be considered for a power receiving device 300E.

(Sixth Modification)

Figure 10:
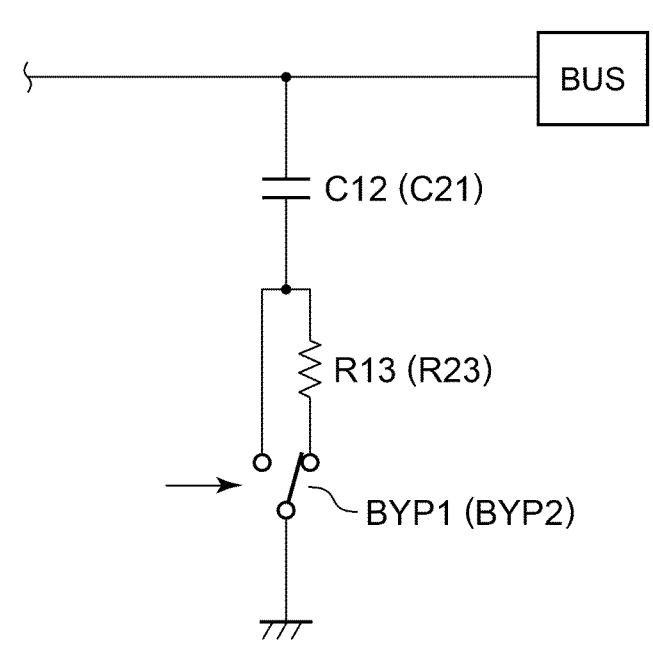
FIG. 10 is a circuit diagram of a part of a feeding device according to a sixth modification.

FIG. 10 is a circuit diagram of a part of a feeding device 200F according to a sixth modification. This modification is obtained by interchanging the bypass circuit BYP1 and the limiting resistance R13 in FIG. 9. A similar modification can be considered for a power receiving device 300F.

(Seventh Modification)

Figure 11:
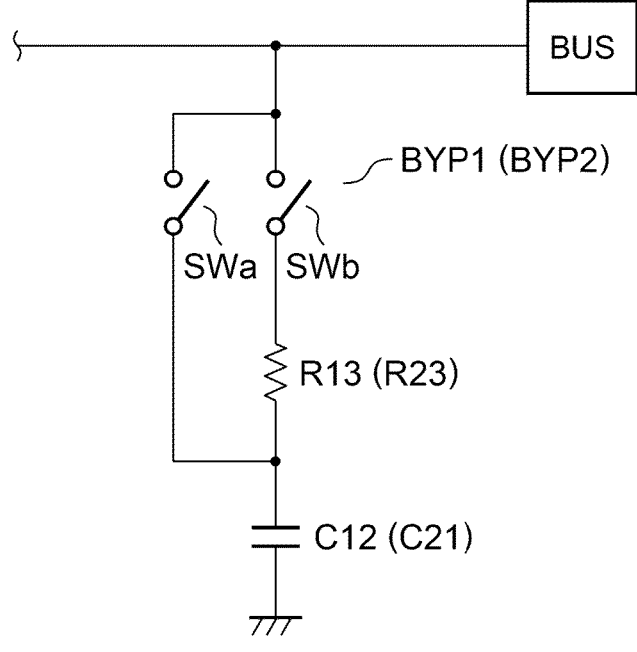
FIG. 11 is a circuit diagram of a part of a feeding device according to a seventh modification.

FIG. 11 is a circuit diagram of a part of a feeding device 200G according to a seventh modification. In this modification, the bypass circuit BYP1 includes two switches SWa and SWb. The first switch SWa is provided in parallel with the limiting resistance R13. The second switch SWb is connected in series with the limiting resistance R13. A similar modification can be considered for a power receiving device 300G.

(Eighth Modification)

Figure 12:
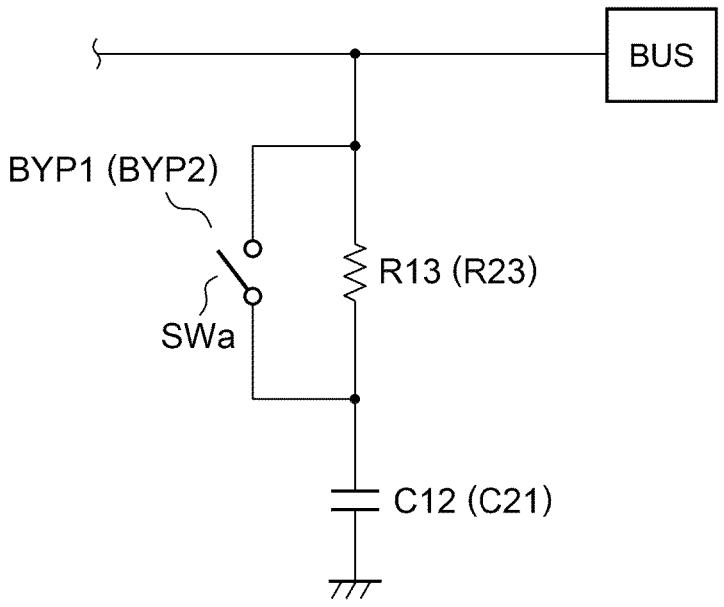
FIG. 12 is a circuit diagram of a part of a feeding device according to an eighth modification.

FIG. 12 is a circuit diagram of a part of a feeding device 200H according to an eighth modification. In this modification, the bypass circuit BYP1 includes one switch SWa.

This configuration is a configuration in which the switch SWb is omitted from the bypass circuit BYP1 in FIG. 11. A similar modification can be considered for a power receiving device 300H.

The embodiments are illustrative, and it is to be understood by those skilled in the art that there are various modifications of combinations of constituent elements and processing processes of those embodiments and that such modifications are also included in the scope of the present disclosure or the present disclosure.

What is claimed is:

1. A universal serial bus Type-C port controller mountable in a sink compatible with universal serial bus power delivery, the sink mounted with the universal serial bus Type-C port controller including
a receptacle including a power supply terminal,
a capacitor,
a limiting resistance connected between the power supply terminal and the capacitor, and
a bypass circuit that is switchable between a bypass state and a non-bypass state, and bypasses the limiting resistance in the bypass state, the universal serial bus Type-C port controller comprising:
a charge control unit that monitors a voltage of the power supply terminal, sets the bypass circuit in the non-bypass state when the voltage of the power supply terminal is lower than a predetermined threshold voltage, and sets the bypass circuit in the bypass state when the voltage of the power supply terminal is higher than the predetermined threshold voltage.

2. The universal serial bus Type-C port controller according to claim 1, wherein
the bypass circuit includes a selector having a first terminal, a second terminal, and a third terminal, the first terminal being connected to the power supply terminal, the second terminal being connected to the capacitor, and the third terminal being connected to the limiting resistance, and
conduction occurs between the first terminal and the second terminal in the bypass state, and conduction occurs between the first terminal and the third terminal in the non-bypass state.

3. The universal serial bus Type-C port controller according to claim 1, wherein
a first end of the limiting resistance is connected to the power supply terminal, and a second end of the limiting resistance is connected to the capacitor,
the bypass circuit includes a first switch connected in parallel with the limiting resistance, and
the first switch is on in the bypass state and is off in the non-bypass state.

4. The universal serial bus Type-C port controller according to claim 3, wherein
the bypass circuit further includes a second switch connected between the power supply terminal and the capacitor and in series with the limiting resistance, and
the second switch is off in the bypass state and is on in the non-bypass state.

5. The universal serial bus Type-C port controller according to claim 1, wherein
the bypass circuit is included in the universal serial bus Type-C port controller.

6. The universal serial bus Type-C port controller according to claim 1, wherein the limiting resistance is included in the universal serial bus Type-C port controller.

7. The universal serial bus Type-C port controller according to claim 1, wherein
the universal serial bus port Type-C controller is integrally integrated on one semiconductor substrate.

8. An electronic apparatus comprising:
a universal serial bus Type-C port controller according to claim 1.

9. An electronic apparatus as a sink compatible with universal serial bus power delivery, the electronic apparatus comprising:
a universal serial bus receptacle including a power supply terminal;
an internal circuit;
a capacitor;
an input switch connected between the power supply terminal and the internal circuit;
a limiting resistance connected between the power supply terminal and the capacitor;
a bypass circuit that is switchable between a bypass state and a non-bypass state, and bypasses the limiting resistance in the bypass state; and
a universal serial bus Type-C port controller that monitors a voltage of the power supply terminal, sets the bypass circuit in the non-bypass state when the voltage of the power supply terminal is lower than a predetermined threshold voltage, and sets the bypass circuit in the bypass state when the voltage of the power supply terminal is higher than the predetermined threshold voltage.

10. A universal serial bus Type-C port controller mountable in a source compatible with universal serial bus Type-C,
the source mounted with the universal serial bus Type-C port controller including
a receptacle having a power supply terminal and a configuration channel terminal,
a power supply circuit,
an output switch disposed between the power supply circuit and the power supply terminal,
a capacitor,
a limiting resistance connected between the power supply terminal and the capacitor, and
a bypass circuit that is switchable between a bypass state and a non-bypass state, and bypasses the limiting resistance in the bypass state,
the universal serial bus Type-C port controller comprising:
a charge control unit that monitors a voltage of the power supply terminal, sets the bypass circuit in the non-bypass state when the voltage of the power supply terminal is lower than a predetermined threshold voltage, and sets the bypass circuit in the bypass state when the voltage of the power supply terminal is higher than the predetermined threshold voltage; and
a switch control unit that controls the output switch on a basis of a state of the configuration channel terminal.

11. The universal serial bus Type-C port controller according to claim 10, wherein
the bypass circuit includes a selector having a first terminal, a second terminal, and a third terminal, the first terminal being connected to the power supply terminal, the second terminal being connected to the capacitor, and the third terminal being connected to the limiting resistance, and conduction occurs between the first terminal and the second terminal in the bypass state, and conduction occurs between the first terminal and the third terminal in the non-bypass state.

12. The universal serial bus Type-C port controller according to claim 10, wherein a first end of the limiting resistance is connected to the power supply terminal, and a second end of the limiting resistance is connected to the capacitor, the bypass circuit includes a first switch connected in parallel with the limiting resistance, and the first switch is on in the bypass state and is off in the non-bypass state.

13. The universal serial bus Type-C port controller according to claim 12, wherein the bypass circuit further includes a second switch connected between the power supply terminal and the capacitor and in series with the limiting resistance, and the second switch is off in the bypass state and is on in the non-bypass state.

14. The universal serial bus Type-C port controller according to claim 10, wherein the bypass circuit is included in the universal serial bus Type-C port controller.

15. The universal serial bus Type-C port controller according to claim 10, wherein the limiting resistance is included in the universal serial bus Type-C port controller.

16. The universal serial bus Type-C port controller according to claim 10, wherein the universal serial bus Type-C port controller is integrally integrated on one semiconductor substrate.

17. An electronic apparatus comprising:

a universal serial bus Type-C port controller according to claim 10.

18. An electronic apparatus as a source compatible with universal serial bus Type-C, the electronic apparatus comprising:

a receptacle having a power supply terminal and a configuration channel terminal;

a power supply circuit;

an output switch disposed between the power supply circuit and the power supply terminal;

a capacitor;

a limiting resistance connected between the power supply terminal and the capacitor;

a bypass circuit that is switchable between a bypass state and a non-bypass state, and bypasses the limiting resistance in the bypass state; and a universal serial bus Type-C port controller that monitors a voltage of the power supply terminal, sets the bypass circuit in the non-bypass state when the voltage of the power supply terminal is lower than a predetermined threshold voltage, sets the bypass circuit in the bypass state when the voltage of the power supply terminal is higher than the predetermined threshold voltage, and controls the output switch on a basis of a state of the configuration channel terminal.

* * * * *